April 20, 1965  M. UMANOFF  3,179,208
AVIATION FOOD SERVING SYSTEM
Filed May 10, 1962  4 Sheets-Sheet 1

INVENTOR.
MARTIN UMANOFF
BY
Leon Edelson

April 20, 1965 — M. UMANOFF — 3,179,208
AVIATION FOOD SERVING SYSTEM
Filed May 10, 1962 — 4 Sheets-Sheet 2

INVENTOR.
MARTIN UMANOFF
BY
Leon Edelson

April 20, 1965      M. UMANOFF      3,179,208

AVIATION FOOD SERVING SYSTEM

Filed May 10, 1962      4 Sheets-Sheet 3

INVENTOR.
MARTIN UMANOFF

BY

*Leon Edelson*

April 20, 1965  M. UMANOFF  3,179,208
AVIATION FOOD SERVING SYSTEM
Filed May 10, 1962  4 Sheets-Sheet 4
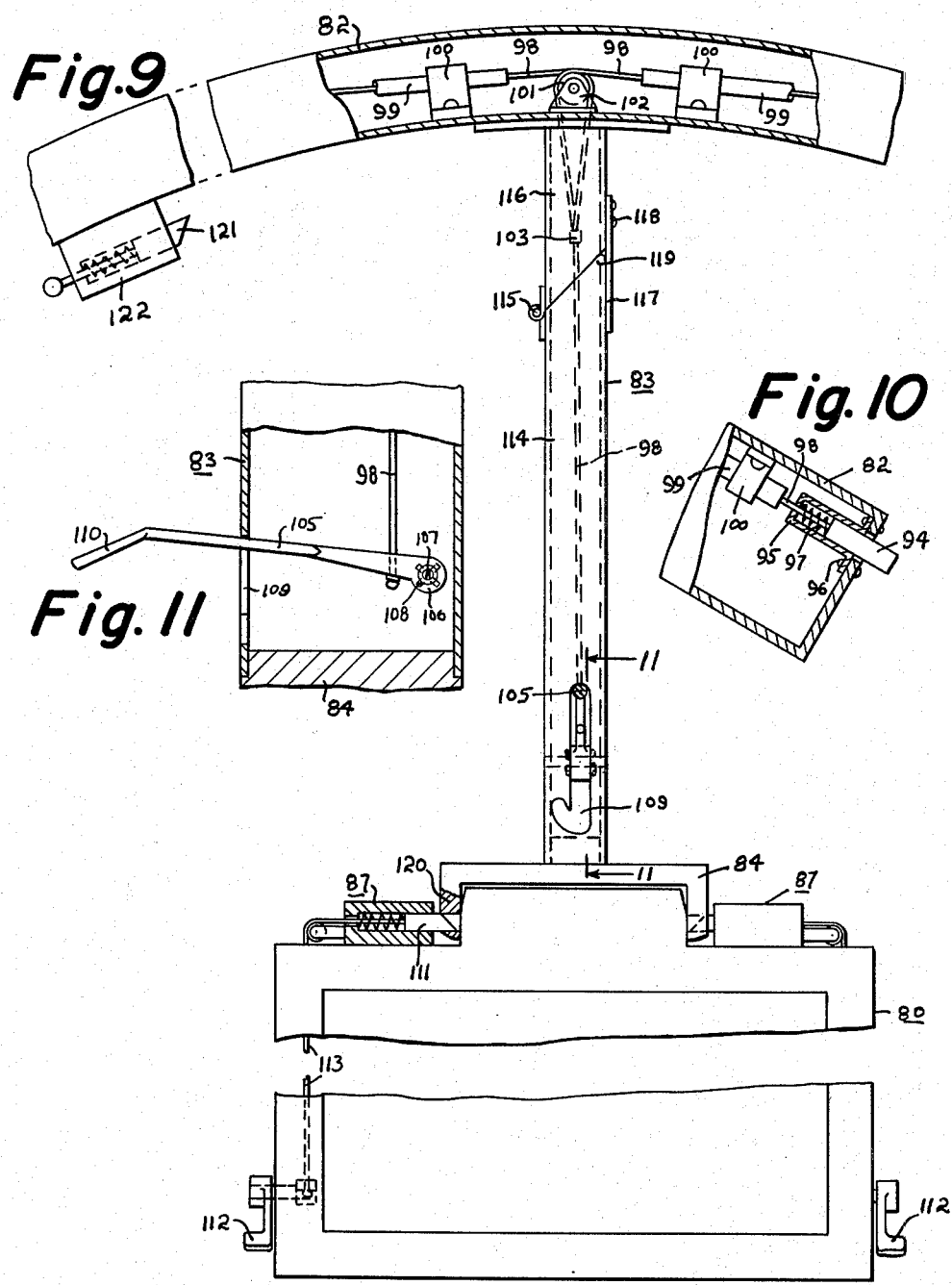
INVENTOR.
MARTIN UMANOFF
BY
Leon Edelson

United States Patent Office 3,179,208
Patented Apr. 20, 1965

3,179,208
AVIATION FOOD SERVING SYSTEM
Martin Umanoff, Huntington, N.Y., assignor to R. A. MacPlum Industries, Inc., Clifton, N.J., a corporation of New Jersey
Filed May 10, 1962, Ser. No. 193,758
9 Claims. (Cl. 186—1)

This invention relates generally to food serving systems, and more particularly relates to food serving systems for use in moving vehicles, as for example in commercial passenger aircraft. Of course, the system to be described may be employed in other types of vehicles such as long distance buses and in trains if it were desired to do so.

As is well known, passenger aircraft flights encompassing several hours' duration usually involve the serving of at least one meal to the passengers by the stewardess. The meals are prepared in the galley of the aircraft which is located at the rear of the plane and are carried on individual trays one at a time to each of the passengers. The stewardess must therefore make as many trips to the galley as are required to serve each of the passengers one at a time, and in the aircraft of today which carry perhaps one hundred passengers it will be readily understood that a great deal of time is required to serve all of the passengers because of the repeated trips to the rear of the plane that are required when only one passenger at a time is served. Additionally, of course, the passengers to be served last are required to wait an extended length of time before being served.

The food serving system according to the invention drastically reduces the length of time involved in serving meals aboard aircraft in that it eliminates the frequent trips to the galley normally made by the stewardess by providing the ability to serve a large number of passengers at one time. Accordingly, it is a primary object of this invention to provide a novel food serving system which contemplates in its broader aspect a food-tray-carrying cabinet longitudinally shiftable along the aisle of the aircraft which is capable of carrying a large number of separate meal trays so that meals may be dispensed one after another from the cabinet as the cabinet is moved up the aisle.

Another object of this invention is to provide a novel food serving system as aforesaid wherein the tray carrying cabinet is physically supported from the aircraft cabin interior by means of tracks along which the cabinet is adapted to roll.

Still another object of this invention is to provide a novel food serving system as aforesaid wherein the structure of the cabinet and supporting assemblies is such that the aisle may be quickly and easily cleared of any impediment to traffic caused by the presence of the cabinet in the event that an emergency condition should arise requiring the same, the aisle clearing being achievable at any point therealong without requiring that the cabinet be shifted along the aisle and back into the galley.

A further object of this invention is to provide a novel food serving system as aforesaid in which the rolling food-tray-carrying cabinet may be locked in position at any desired point along its length of travel to prevent a runaway condition of the cabinet due to sudden changes in the attitude of the aircraft.

The foregoing and other objects of the invention will become clear from a reading of the following specification in conjunction with an examination of the appended drawings, wherein:

FIGURE 9 is an enlarged fragmented and sectioned elevational view of the food carrying cabinet and trolley structure, with portions being broken away to reveal details of the internal construction;

FIGURE 10 is an enlarged fragmentary sectional view through the end structure of the trolley as seen in FIGURE 8 which reveals additional details of the trolley locking structure;

Figure 12:
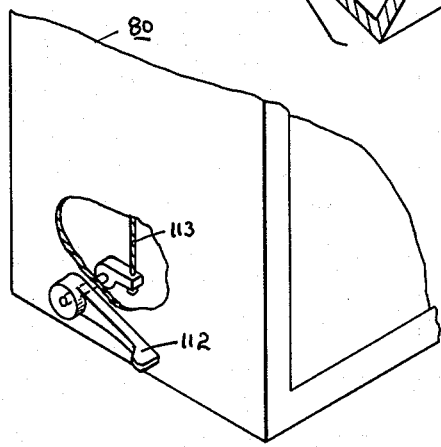

FIGURE 11 is an enlarged vertical sectional view through the cabinet supporting column extending downward from the trolley shown in FIGURE 9 as would be seen when viewed along the line 11—11 of FIGURE 9; and FIGURE 12 is an enlarged fragmentary perspective view of one of the lower corners of the trolley-suspended cabinet illustrating the thumb operated levers operable to release the cabinet from its supporting column.

In the several figures, like elements are denoted by like reference characters.

Figure 1:
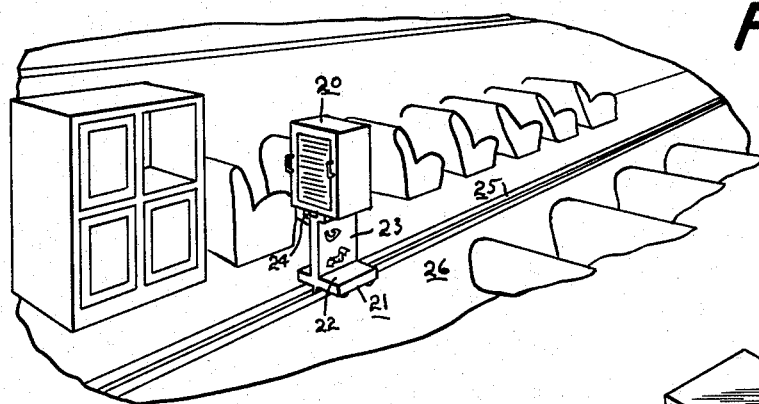
FIGURE 1 illustrates in perspective view a portion of the interior of an aircraft cabin showing one form of the invention in which the tray carrying cabinet is in the form of a floor supported unit shiftable longitudinally of the aisle along a path determined by a downwardly recessed floor track which is flush with the floor surface.
Figure 2:
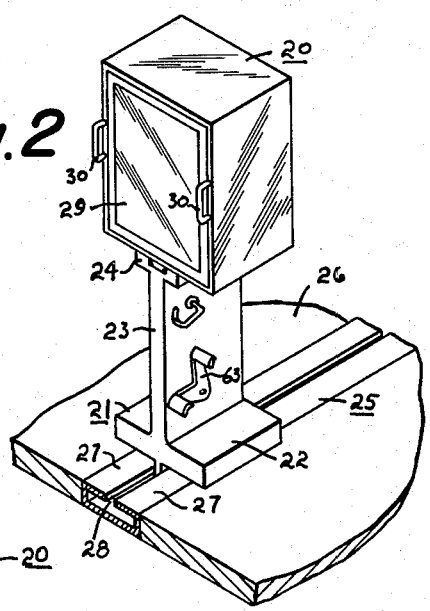
FIGURE 2 is an enlarged perspective view of the floor supported food cabinet shown in FIGURE 1 together with a fragment of the guiding track and the cabin floor.
Figure 3:
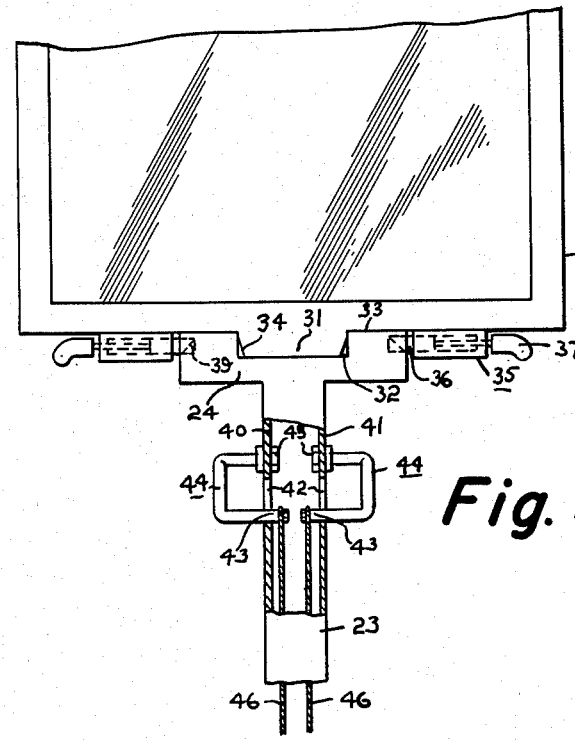
FIGURE 3 is an enlarged fragmentary front elevational view of the cabinet shown in FIGURE 2 with portions thereof broken away to show some of the details of the structure.

Considering first the embodiment of FIGURES 1 through 6, the overall aspects of the system are best illustrated in the showings of FIGURES 1 to 3 to which attention should be first directed. The tray carrying cabinet 20 is detachably secured to an I-shaped floor supported rolling stand 21 which latter includes a dolly portion 22 surmounted by a vertically extending hollow column 23 terminating at its upper end in a cabinet-receiving and supporting platform 24. Recessed downward into the floor and extending centrally lengthwise of the aisle of the aircraft is a C-shaped track 25 so disposed within the floor 26 that the apposed arms 27 of the C-shaped track are substantially flush with the floor surface and are spaced apart from one another so as to provide a narrow slotway 28 therebetween. As will be subsequently explained in connection with the showing of FIGURE 4, the narrow slotway 28 of the track 25 provides a continuous running opening through which the rolling stand 21 is secured to a skate disposed within the track 25, which skate prevents the stand 21 and cabinet 20 from being thrown about as a result of attitude changes of the aircraft.

As best seen in FIGURES 2 and 3, the cabinet 20 is illustrated as being of generally rectangular form and is provided with a door 29 which may of course be opened to gain access to the trays stored within the cabinet, and a pair of side handles 30 which may be grasped by the stewardess to push or pull the cabinet 20 and stand 21 along the track 25. The door 29 may be of the conventional swing-away hinged type, or may take any number of alternative forms as desired. For example, the door could be of jalousie type with pivoting panes horizontally alignable with the cabinet shelves, or it might take the form of a vertically sliding element with a hinge-over provision so that when opened the door would lie horizontally across the cabinet top. In any event, the particular form of door 29 is not critical.

The bottom of the cabinet 20 is provided with a centrally depending tongue formation 31 which seats close fittingly within a complementally shaped channel 32 formed in the platform section 24 of the stand 21 and recessed downward from the upper platform surfaces 33. The lower edges of the cabinet tongue 31 are chamfered as at 34 to provide an easy lead-in for the tongue. Also mounted to the undersurface of the cabinet 20 are a pair of spring latching devices, designated generally as 35, each of which includes a spring-loaded draw bolt 36 which is retractable against the spring loading pressure by means of the handles 37 secured to the outer ends of the draw bolts 36. These draw bolts 36 are disposed within the latching holes 38 formed in the outer lateral side of the stand platform section 24 when the cabinet 20 is seated upon the stand. The ends of the draw bolts 36 are also chamfered as at 39 to cam the bolts and cause them to shift laterally outward when the cabinet 20 is set down upon the platform 24 without requiring that the draw bolt handles 37 be operated.

Cut through the side walls 40 and 41 of the hollow support column 23 are a pair of substantially vertically oriented arcuate slots 42 through which project the free terminal ends 43 of a pair of U-shaped hand grips 44, the remaining ends of the hand grips being projected through and pivotally secured to the column side walls 40 and 41, as at 45. The hand grips have secured to their free ends 43 a pair of cables 46 extending downwardly through the interior of the hollow column 23, these cables comprising part of the latching release mechanism by means of which the entire stand 21 may be detached from the skate disposed within the track 25, as will become clear from the description of FIGURE 4 to which attention should be now directed.

Figure 4:
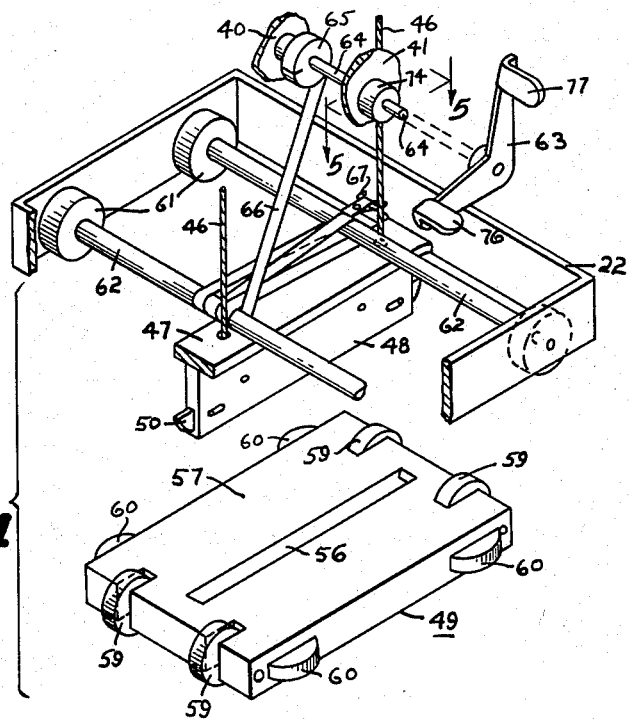
FIGURE 4 is an enlarged partially exploded view of the cabinet stand and rolling support, with most of the housing structure sectioned away to reveal internal details of the construction.

The dolly 22 of the stand 21 is illustrated in the partially exploded perspective view of FIGURE 4 with the upper surface and near side surfaces sectioned away to disclose the inner constructional features. Extending centrally from front to rear of the dolly 22 proximate the lower edge of the sidewall skirts is an integrally formed rib 47 to the under surface of which is secured a vertically downward extending latching block 48. The latching block 48 is of a thickness somewhat less than the narrow slotway 28 of the C-shaped floor track 25 so that it is projectable downward therethrough for engagement with the track skate generally designated in FIGURE 4 as 49.

Figure 6:
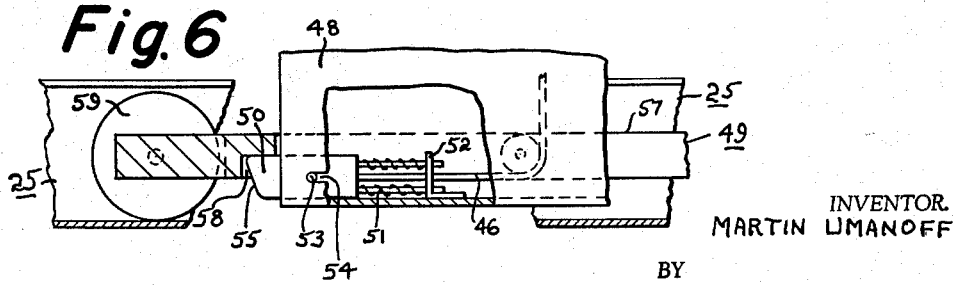
FIGURE 6 is an enlarged fragmentary partially sectioned view of the locking device by means of which the cabinet stand of FIGURE 4 is releasably secured to the below-lying and concealed skate structure, as would be seen when viewed along the line 6—6 of FIGURE 4.

As best seen in FIGURES 4 and 6, the latching block 48 is provided at the opposite ends thereof, near the bottom, with a pair of latching bars 50 resiliently biased outwardly endwise of the block 48 by means of the springs 51 acting against the inside end faces of the latching bars 50 and brackets 52 secured to the bottom of the latching block 48. Secured to and projecting laterally of each of the latching bars 50 is a pin 53 disposed within an elongated guide slot 54 punched through the side walls of the latching block 48. The pins 53 and guide slots 54 permit the latching bars 50 to shift axially between extended latching position, as shown in FIGURE 6, and an unlatching position wherein the latching bars 50 are retracted within the confines of the latching block 48.

The retracting action is provided through the cables 46 which have one end secured to the interior rear surface of each of the latching bars 50 and which have the opposite ends secured to the free terminal ends 43 of the hand grips 44 as shown in FIGURE 3. When the hand grips 44 are pivoted upward within the arcuate slots 42 of the hollow vertical support column 23, the cables 46 are pulled upward and cause the latching bars 50 to be retracted and thereby allow the entire rolling stand 21 to be disengaged from the skate 49 and removed from the track 25. It will be observed that the latching bars 50 are formed so that the exterior end surfaces 55 are inclined at an angle. The inclination of the latching bar ends 55 provides a camming surface by means of which the rolling stand 21 may be latched to the skate 49 when the latching block 48 is projected downward into the skate slot 56.

As best seen in FIGURE 6, the skate slot 56 extends completely through the platform section 57 of the skate 49 and extends fore and aft therebeneath to provide the undercut recesses 58 within which the latching bars 50 extend to lock the stand to the skate. When the latching block 48 is projected downward into the skate slot 56, the latching bar camming surfaces 55 strike the ends of the slot 56 and are forced axially inward against the outward biasing action of the springs 51 to permit passage of the block 48 downward through the slot. When the latching bars 50 descend to the level of the recesses 58, the bars snap outward and latch the stand to the skate. The skate 49 is itself a simple affair and includes four wheels 59, mounted for rotation in vertical planes, which ride upon the inside bottom surface of the track 25, and four other wheels 60 mounted for rotation in a horizontal plane and which engage the inside surfaces of the sides of the track 25. The skate 49 does not support the weight load of the cabinet 20 and rolling stand 21, this function being accounted for by the wheels 61 fixedly mounted on axles 62 which are rotatably journalled in the side wall skirts of the dolly 22, the skate 49 merely acting as a stabilizing element which prevents the cabinet and rolling stand from being thrown about within the cabin of the aircraft as a result of attitude changes of the latter.

Figure 5:
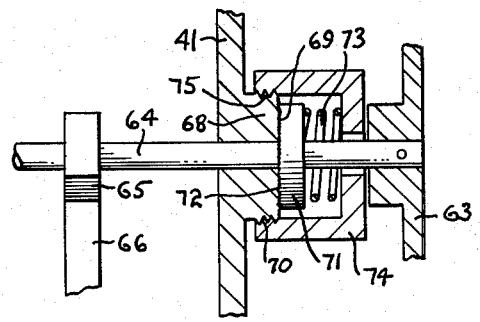
FIGURE 5 is an enlarged fragmentary sectional view of a portion of the brake structure for the cabinet stand as would be seen when viewed along the line 5—5 of FIGURE 4.

The remaining aspect for consideration is the brake system by means of which the cabinet 20 and rolling stand 21 may be immobilized at any desired point along the trackway so that the stewardess may withdraw food trays for delivery to the passengers and collect the same at a later time without there being any danger of the cabinet and stand rolling off down the aisle while the stewardess is so engaged. The details of the brake system are best shown in FIGURES 4 and 5, to which reference should be now made.

As best seen in FIGURE 4, a brake foot pedal 63 is pinned to a shaft 64 which passes through and is revolubly journalled in the side walls 40 and 41 of the hollow column 23. Fixed upon the shaft 64 between the hollow column walls 40 and 41 for rotation with the shaft is a brake-band drum 65 about the periphery of which is wrapped a brake band 66 with one end fixedly secured to the drum. The brake band 66 extends downward from the drum 65 and is looped several times about and between the dolly axles 62 and has its opposite end fixedly secured to an anchor ring 67 extending inward from the inside face of the front skirt of the dolly 22. As best seen in the enlarged fragmentary sectional detail of FIGURE 5, the outer face of the column side wall 41 is formed with a boss 68 projecting therefrom, the boss being provided with a friction facing 69 and a threaded exterior side wall 70. Fixedly mounted upon the shaft 64 for rotation therewith is a disc 71 provided with a friction facing 72 disposed in gripping engagement with the friction facing 69 of the boss 68. Disposed about the shaft 64 immediately adjacent to the outer side of the disc 71 is a compression spring 73, and enclosing the disc 71 and compression spring 73 is a cylindrical hollow housing 74 the outer end wall of which is centrally apertured to permit passage therethrough of the shaft 64, and the opposite end of which is open and interiorly threaded as at 75 for threaded engagement with the side wall 70 of the boss 68.

When the housing 74 is threaded upon the boss 68 as shown, the spring 73 is placed in compression and forces the disc 71 against the boss 68 to forcibly engage the respective friction facings 72 and 69 and thereby prevent the shaft 64 from rotating. When the lower thread 76 of the brake pedal 63 is depressed, the shaft 64 rotates against the friction restraint provided by the facings of the disc 71 and boss 68 to thereby wrap the brake band 66 about the brake drum 65 and tighten the brake band 66 about the dolly axles 62 to lock the latter and prevent rotation of the dolly wheels 61, thus immobilizing the rolling stand 21. The brake is released by kicking or depressing the brake pedal release tread 77 to counter-rotate the shaft 64 and partially unwrap the brake band 66 from the periphery of the drum 65 to thereby relieve the tension in the brake band and release the binding pressure on the dolly axles 62 so that the stand 21 may again be rolled either forward or backward.

The several component parts of the food serving system are utilized in the following manner. When it is desired to serve a meal aboard the plane, the rolling stand 21 may be secured to the skate 49 back in the galley into which the track 25 extends, and the cabinet 21 may then be placed upon the stand and latched thereto as previously described. The loaded cabinet 20 is rolled up the aisle and the trays are dispensed one after another until the cabinet is empty, at which time the stand 21 is rolled back into the galley and the cabinet 20 may be either reloaded or may be completely removed from the stand 21 and a new loaded cabinet 20 may be attached to the stand in its place. The stand 21 is then again rolled up the aisle and additional food trays are served to the passengers. In this manner, it will be readily understood that the time required for the serving of a meal to all of the passengers carried by the airplane is markedly reduced. The empty food trays may of course be collected in the same manner, and since trays of this type are generally stackable and nestable one within the other even fewer trips are required since a large number of empty trays may be placed in a cabinet as compared of course to the number of trays carried thereby when each tray is loaded with food.

If desired, the cabinet 20 could be of such a construction that the interior wall surfaces thereof include heating devices such as of the radiant energy types, and the cabinets could include a provision whereby a plug-in energizing circuit would permit the rapid heating of food trays prestored within the cabinet. In this manner, one stewardess could be serving food trays to passengers while another stewardess in the galley would energize a second cabinet to heat the food trays therewithin. Thus when the first cabinet were emptied and were returned to the galley, a second cabinet would be all prepared and waiting, which would again further minimize the time required to serve a meal. Of course, in the event that a cold meal were being served there would be no need to energize the cabinets to heat the contents thereof, or alternatively if the cabinets 20 are merely of the storage type they would be individually loaded in the galley with food trays prepared there.

In lieu of the floor track type of food serving system just described in connection with the illustrations of FIGURES 1 through 6, the food serving system could take the form of an overhead suspension or trolley type of serving system. One form of such an overhead system is illustrated in the showings of FIGURES 7 through 12 to which attention should now be directed.

Figure 7:
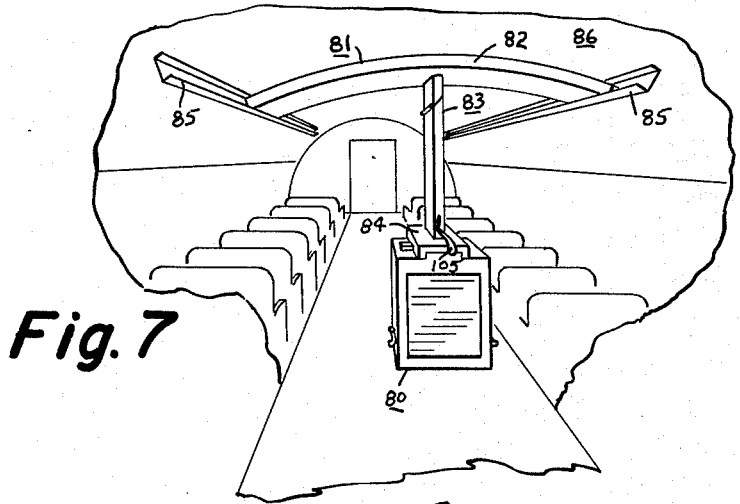
FIGURE 7 illustrates in perspective view another form of the invention similar to that of FIGURE 1 with the exception that the tray-carrying cabinet is supported from overhead by a pair of longitudinally extending parallel tracks secured to the ceiling portion of the cabin.
Figure 8:
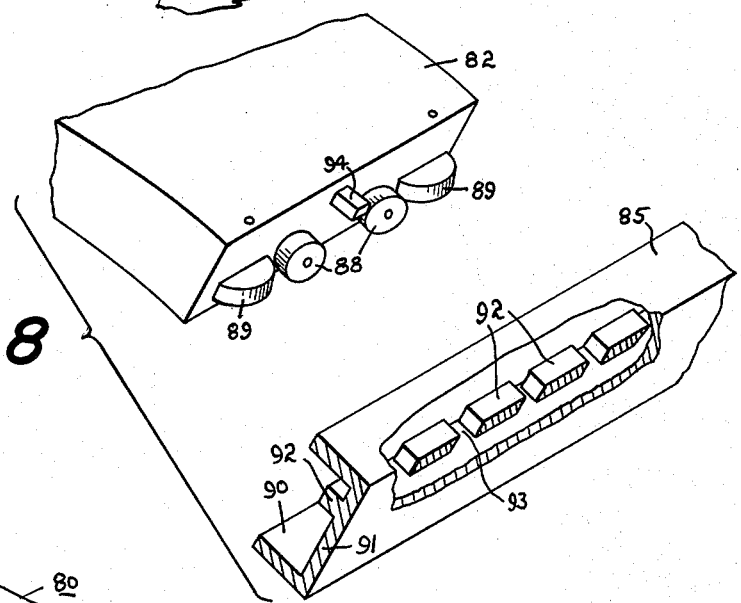
FIGURE 8 is an enlarged fragmentary perspective view of one of the ceiling mounted tracks and the end structure of the cabinet supporting trolley, this structure being shown in partially exploded form and with a portion of the track sectioned away to disclose certain details of the trolley position locking structure.

Referring primarily to FIGURES 7, 8 and 9 it is observed that the food carrying cabinet 80 is carried by a rolling trolley generally designated as 81 which includes a bridge 82 from which depends a hollow column 83 terminating at its lower end in a latching channel 84 to which the cabinet 80 is secured by means of the latching devices designated generally as 87. The opposite ends of the bridge 82 of the trolley each carry a plurality of free rolling load bearing wheels two of which are designated as 88 positioned for rotation in a vertical plane, and two of which are designated as 89 positioned for rotation in a horizontal plane, these wheels being disposed within the confines of the tracks 85 which are fixedly secured to the cabin interior at the ceiling region 86. The wheels 88 carry the major weight load and when disposed within the track 85 seat upon and roll along the lower flange 90 thereof while the wheels 89 prevent end binding of the bridge 82 within the tracks 85 and rollingly engage with the lower region of the inside surface of the track wall 91.

The track wall 91 is formed with a longitudinally extending series of end-wise spaced and aligned stop blocks or buttresses 92 with gaps or slots 93 therebetween, these slots 93 being somewhat longer than the width of the latching bar 94 reciprocally shiftable on its own long axis endwise of the trolley bridge 82 for disposition within and retraction out of the track slots 93. When the latching bars 94 at opposite ends of the bridge 82 are disposed within the slots 93 of the track 85 it will be appreciated that the entire trolley 81 is immobilized and cannot shift longitudinally of the tracks 85.

As best seen in the enlarged detail of FIGURE 10, the latching bar 94 is shiftable endwise of the bridge 82 within the confines of a bracket 95 secured to the ends of the bridge 82 as at 96, the latching bar 94 being biased outward by means of the compression spring 97 disposed between the rear wall of the bracket 95 and the latching bar 94. Secured to the latching bar 94 and extending rearwardly therefrom through a rear wall aperture in the bracket 95 is a cable 98 which extends through guide sleeves 99 secured by brackets 100 to the inside of the bridge 82. The guide sleeves 99 extend from opposite ends of the bridge 82 to the center thereof proximate the location of the hollow column 83. The cables 98 emerging from the inner ends of the guide sleeves 99 pass over a pair of pulleys 101 rotatably secured to the bridge 82 as by means of the brackets 102 and then turn downward through an opening in the bottom of the bridge 82 and connect together at the point 103 within the column 83, one of the cables 98 then continuing downward to a point of connection and securement 104 with a latch controlling lever 105, as best seen in the detail view of FIGURE 11.

The lever 105 is formed at its rear end with an eye 106 through which extends a shaft 107 secured to the side walls of the hollow column 83. The lever eye 106 is of larger inside diameter than is the diameter of the shaft 107 so that a generally loose connection is formed permitting a desired degree of lateral motion of the lever 105, the eye end of lever 105 being maintained in its generally centered position by means of pins 108 projecting from the shaft 107 on opposite sides of the lever eye. The lever 105 extends forward and out through the top of a J-shaped slot opening 109 cut through the front wall of the hollow column 83 and terminates at its forward end in a handle 110.

The lever 105 is normally disposed at the top of the J-shaped slot 109 by virtue of the upward pull on the cable 98 resulting from the biasing action of the compression springs 97 on the associated latching bars 94 to which the opposite ends of the cables 98 are secured. In this position of the lever 105, the latching bars 94 are of course extended and disposed within track slots 93 to immobilize the trolley structure. When it is desired to release the trolley 81 for motion longitudinally of the tracks 85, the lever 105 is pulled downward within the slot 109 by means of the handle 110 to thereby retract the latching bars 94 against the biasing action of the compression springs 97, and this unlatched condition may be continuously maintained if desired by laterally shifting the control lever 105 at the bottom of the slot 109 to thereby allow the lever to move upward into the upturned tail of the J-shaped slot. The lever may of course be at this point released and will latch in the tail portion of the J-slot so that the latching bars 94 are prevented from shifting outward for engagement with the track 85 between the stop blocks 92.

As best seen in FIGURE 9 and the detail of FIGURE 12, the cabinet 80 is latched to the support column latching channel 84 by means of the latching devices 87 previously mentioned. The latching devices 87 include spring loaded draw bolts 111 which coact with the latching channel 84 of the column 83 in exactly the same manner as previously described with regard to the latching devices 35 illustrated in FIGURE 3, the sole difference being that the latching devices 87 are actuated by means of the thumb levers 112 secured to the cabinet 80 and the cables 113 instead of being actuated by handle devices of the type shown at 37 in FIGURE 3. Release of the cabinet 80 from its securement with the latching channel 84 is accomplished by depressing the thumb levers 112 to withdraw the spring loaded draw bolts 111, and thus allow the cabinet 80 to be dropped out of engagement with the latching channel 84.

With the cabinet 80 so disengaged from the hollow column 83, the lower section 114 may be swung laterally about the hinge 115 which secures it to the upper column section 116 against the restraint imposed by the flat spring 117 which is also secured to the column upper section as at 118. When the point 119 of the column lower section 114 swings downward past the horizontal level of the hinge 115 against the restraint of the flat spring 117, the entire column lower section 114 may be swung upward so that the latching channel flange 120 rises into engagement with and passes beyond the spring loaded latching bar 121 of the latching device 122, which latter is fixedly secured to the undersurface of the bridge 82, to thereby hold the column lower section 114 securely up against the bridge 82.

In event of an emergency situation involving the aircraft, wherein it may be necessary to immediately clear the aisle of any obstruction, it will be appreciated that the cabinet 20 of the first embodiment and the cabinet 80 just previously discussed may each be quickly detached from their associated supporting mechanisms and moved laterally of the aisle into a seat region. Additionally, the rolling stand 21 shown in the embodiment of FIGURES 1 through 6 may be rapidly detached from its track skate mechanism by operation of the latching release handles 44 and also cleared from the aisle. The embodiment of FIGURES 7 through 12 does not require removal of the trolley structure since it is out of the way to begin with, but does require that the depending supporting column 83 be swung out of the way, this being accomplished as previously described by merely pushing the lower section 114 of the support column 83 laterally to the side and causing it to latch up against the bridge 82.

Having now described my invention in connection with the particularly illustrated embodiments thereof, it will be appreciated that variations and modifications of the same may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A food serving system for dispensing meals to the passengers of a movable vehicle, comprising in combination, a storage cabinet into which food may be loaded and from which the food may be subsequently dispensed, a food cabinet guiding and anchoring apparatus including a permanently fixed position guide track extending through the passenger compartment region of the movable vehicle and a food cabinet support device captive to and shiftable along said guide track, said guide track being recessed downward into the floor of the movable vehicle passenger compartment and said support device including a skate device captive to said guide track and rollable longitudinally thereof, said food cabinet support device including a dolly rollable along the floor longitudinally of the guide track and carrying latching means engageable with said track captive skate to lock the dolly to the skate, means carried by and operable from said cabinet support device for unlatching and detaching the latter from said captive skate, latching means partly associated with said cabinet and partly associated with said support device for detachably securing said food cabinet to said support device, said latching means being operative to automatically interlock said food cabinet and support device when the same are brought into physical engagement and being releasable by means carried by said cabinet to thereby detach the cabinet from the support device, and position locking means carried by said support device effective when operated for locking the support device at any desired point of its travel along said guide track.

2. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, and means carried by and operable from said food cabinet support device for unlatching said skate latching means and detaching the said support device from said skate.

3. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, means carried by and operable from said food cabinet support device for unlatching said skate latching means and detaching the said support device from said skate, and selectively operable means carried by said support device for locking said dolly against motion at any desired point along the length of said track and thereafter releasing the same for continued motion.

4. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, means carried by and operable from said food cabinet support device for unlatching said skate latching means and detaching the said support device from said skate, cabinet latching means partly associated with said cabinet and partly associated with said support device for detachably securing said food cabinet to said support device, said cabinet latching means being operative to automatically interlock said food cabinet and support device when the same are brought into properly positioned physical engagement, and means carried by said cabinet operable to release said cabinet latching means to thereby permit detachment of said cabinet from said support device.

5. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, means carried by and operable from said food cabinet support device for unlatching said skate latching means and detaching the said support device from said skate, cabinet latching means including spring loaded shiftable latching elements carried by one of said cabinet and support device and latching elements receiving means carried by the other of said cabinet and cabinet support device, said spring loaded shiftable latching elements being operative to automatically interlock said cabinet and support device when the same are brought into properly positioned physical engagement, and handle means carried by said cabinet operable to disengage said spring loaded latching elements from said latching elements receiving means and thereby permit said cabinet to be separated from said support device.

6. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, means carried by and operable from said food cabinet support device for unlatching said skate latching means and detaching the said support device from said skate, selectively operable means carried by said support device for locking said dolly against motion at any desired point along the length of said track and thereafter releasing the same for continued motion, cabinet latching means partly associated with said cabinet and partly associated with said support device for detachably securing said food cabinet to said support device, said cabinet latching means being operative to automatically interlock said food cabinet and support device when the same are brought into properly positioned physical engagement, and means carried by said cabinet operable to release said cabinet latching means to thereby permit detachment of said cabinet from said support device.

7. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, and pull-up handle means carried by said cabinet support device and coupled to said skate latching means operative when pulled upward upon to release the said skate latching means from latching engagement with said skate and function as lifting handles for the said cabinet support device to thereby permit the latter to be quickly removed from the guide track.

8. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, means carried by and operable from said food cabinet support device for unlatching said skate latching means and detaching the said support device from said skate, and brake means carried by said support device for locking the rollers of said dolly against motion, said brake means being selectively operable and releasable by foot actuated means carried by said support device and operatively coupled to said brake means.

9. A food serving system for dispensing meals to the passengers of a movable vehicle, comprising in combination, a storage cabinet into which food may be loaded and from which the food may be subsequently dispensed, a hollow guide track extendable through the passenger compartment of the vehicle proximate to all of the seat locations thereof and having a captive skate device disposed rollably longitudinally therewithin, said guide track being recessed downward into the floor and having its upper face longitudinally slotted and disposed flush with the floor surface, a food cabinet support device including a dolly rollable along the floor longitudinally of the said guide track and skate latching means extending downward through the track slot into latching engagement with the said skate to thereby lock the dolly to the track, pull-up handle means carried by said cabinet support device and coupled to said skate latching means operative when pulled upward upon to release the said skate latching means from latching engagement with said skate and function as lifting handles for the said cabinet support device to thereby permit the latter to be quickly removed from the guide track, cabinet latching means including spring loaded shiftable latching elements carried by one of said cabinet and support device and latching elements receiving means carried by the other of said cabinet and cabinet support device, said spring loaded shiftable latching elements being operative to automatically interlock said cabinet and support device when the same are brought into properly positioned physical engagement, and handle means carried by said cabinet operable to disengage said spring loaded latching elements from said latching elements receiving means and thereby permit said cabinet to be separated from said support device.

References Cited by the Examiner

UNITED STATES PATENTS

| | | | |
|---|---|---|---|
| 433,886 | 8/90 | Busenbenz | 188—25 |
| 659,057 | 10/00 | Doyle | 186—1 |
| 992,672 | 5/11 | Killpatrick | 186—1 |
| 1,314,965 | 9/19 | Lamont | 196—1 |
| 1,677,267 | 7/28 | Bristol | 186—1.3 |
| 2,435,755 | 2/48 | Schimpff | 186—1.3 |
| 2,547,292 | 4/51 | Tascher et al. | 186—1 |
| 2,649,930 | 8/53 | Purdy | 186—1.3 |
| 2,692,744 | 10/54 | Burkhard | 244—137 |
| 3,102,607 | 9/63 | Roberts | 186—1 |

ROBERT B. REEVES, *Acting Primary Examiner.*

KARL J. ALBRECHT, SAMUEL F. COLEMAN, *Examiners.*